(12) United States Patent
Yamaguchi et al.

(10) Patent No.: US 11,143,635 B2
(45) Date of Patent: Oct. 12, 2021

(54) LIQUID DELIVERY DEVICE AND LIQUID CHROMATOGRAPH

(71) Applicant: SHIMADZU CORPORATION, Kyoto (JP)

(72) Inventors: Tadayuki Yamaguchi, Kyoto (JP); Naoki Asakawa, Tokyo (JP); Yuki Sato, Tokyo (JP); Kosuke Fukuzawa, Tokyo (JP); Motoaki Murakoshi, Tokyo (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/621,369

(22) PCT Filed: Jul. 4, 2017

(86) PCT No.: PCT/JP2017/024544
§ 371 (c)(1),
(2) Date: Dec. 11, 2019

(87) PCT Pub. No.: WO2019/008683
PCT Pub. Date: Jan. 10, 2019

(65) Prior Publication Data
US 2020/0166486 A1 May 28, 2020

(51) Int. Cl.
*G01N 30/32* (2006.01)
*G01N 30/34* (2006.01)

(52) U.S. Cl.
CPC .......... *G01N 30/32* (2013.01); *G01N 30/34* (2013.01); *G01N 2030/326* (2013.01); *G01N 2030/342* (2013.01)

(58) Field of Classification Search
CPC .. G01N 30/32; G01N 30/34; G01N 2030/326; G01N 2030/342
See application file for complete search history.

(56) References Cited

FOREIGN PATENT DOCUMENTS

| | | |
|---|---|---|
| CN | 205280673 U | 6/2016 |
| JP | 2006-038738 A | 2/2006 |
| JP | 2006038738 A | 2/2006 |
| JP | 2011-085434 A | 4/2011 |

OTHER PUBLICATIONS

Taylor, M., et al., "Removal of contaminant peaks in reversed-phae gradient liquid chromatography for improved detection of pharmaceutical impurities", LCGC Europe, vol. 28, Issue 9, 488-499. Sep. 1. (Year: 2015).*

(Continued)

*Primary Examiner* — Benjamin L Lebron
(74) *Attorney, Agent, or Firm* — Renner, Otto, Boisselle & Sklar, LLP

(57) ABSTRACT

A liquid delivery device includes a liquid delivery pump that sucks a mobile phase, which is liquid, from a mobile phase container containing the mobile phase through a suction pipe whose end is immersed in the mobile phase in the mobile phase container, and feeds the mobile phase, and at least one dissolved substance removal filter that is provided at a position upstream of the liquid delivery pump on a path through which the mobile phase flows and is filled with a filler having the property of adsorbing a dissolved substance in the mobile phase.

5 Claims, 3 Drawing Sheets

(56) References Cited

OTHER PUBLICATIONS

Lahaie, M., et al., "Elimination of isobaric interference and signal-to-noise ratio enhancement using on-line mobile phase filtration in liquid chromatography/tandem mass spectrometry", Rapid Communications in Mass Spectrometry, 28, 886-892. (Year: 2014).*
CN 205280673 machine translation. Aug. 24, 2021.*
Office Action for corresponding JP Application No. 2019-528244 dated Nov. 24, 2020, with English machine translation.
Kunihiro Watanabe et al.; "The adsorption of metal ions to the inner surface of a Teflon tube and its inhibition effect for FIA"; Bunseki Kagaku; vol. 50, No. 7, pp. 509-515; 2001 The Japan Society for Analytical Chemistry. Partial English translation.
International Search Report for corresponding Application No. PCT/JP2017/024544, dated Oct. 3, 2017.
International Written Opinion for corresponding Application No. PCT/JP2017/024544, dated Oct. 3, 2017.
Office Action for corresponding CN Application No. 201780091252.1 dated Jun. 24, 2021, with English language machine translation.

* cited by examiner

LIQUID DELIVERY DEVICE AND LIQUID CHROMATOGRAPH

TECHNICAL FIELD

The present invention relates to a liquid delivery device for delivering a mobile phase which is liquid, and a liquid chromatograph using the liquid delivery device.

BACKGROUND ART

In an analyzer such as a liquid chromatograph, a liquid delivery device that delivers liquid as a mobile phase is provided. The liquid delivery device immerses an end of a suction pipe in a mobile phase contained in a mobile phase container, sucks the mobile phase with a liquid delivery pump through the suction pipe, and delivers the mobile phase.

In general, a filter called a suction filter is attached to an end of a suction pipe immersed in a mobile phase in a mobile phase container (see Patent Document 1). By providing the suction filter at the end of the suction pipe, a solid matter in the mobile phase can be removed simultaneously with the suction of the mobile phase from the mobile phase container.

PRIOR ART DOCUMENT

Patent Document

Patent Document 1: Japanese Patent Laid-open Publication No. 2006-038738

SUMMARY OF THE INVENTION

Problems to be Solved by the Invention

Liquid used as a mobile phase in an analyzer, such as a liquid chromatograph, can be contaminated at various locations, including an environment in which the device is used (a laboratory, a pretreatment room, and the like), an ultra-pure water purifier, a mobile phase container, and the like. For example, a mobile phase is contaminated by carbon dioxide in intake air that dissolves in liquid contained in the mobile phase container, or a residue of detergent used for cleaning the mobile phase container that dissolves in liquid that becomes a mobile phase.

In recent years, in liquid chromatography, the sensitivity of a detector, such as a mass spectrometer, has improved, and a compound at a lower concentration can be analyzed. On the other hand, in high-sensitivity analysis, even if a mobile phase is slightly contaminated as described above, a substance other than an analyte dissolved in the mobile phase is detected by the detector, and becomes an obstacle in the analysis. Further, when a slightly contaminated mobile phase enters an analysis system, a contaminant adheres to the inside of a pipe or a column and the analysis system itself is contaminated, which may cause detection sensitivity to be lowered.

However, a suction filter that is conventionally used has been unable to remove a contaminant dissolved in a mobile phase. On the other hand, if a means for removing such a contaminant is provided in the analysis system, there is a possibility that the dead volume is increased and the separation performance is lowered. In particular, in a case where a gradient analysis for performing separation analysis of a sample while changing the composition of a mobile phase is performed in a liquid chromatograph, the larger the internal volume in the system downstream of a liquid delivery pump, the slower the change in the composition of the mobile phase, which lowers the analysis efficiency.

In view of the above, an object of the present invention is to remove a contaminant dissolved in a mobile phase without increasing the dead volume in the system.

Solutions to the Problems

A liquid delivery device according to the present invention includes a liquid delivery pump that sucks a mobile phase, which is liquid, from a mobile phase container containing the mobile phase through a suction pipe whose end is immersed in the mobile phase in the mobile phase container, and delivers the mobile phase, and at least one dissolved substance removal filter provided at a position upstream of the liquid delivery pump on a path through which the mobile phase flows. The dissolved substance removal filter is filled with a filler having the property of adsorbing a dissolved substance in the mobile phase.

In the liquid delivery device of the present invention, the dissolved substance removal filter preferably includes a suction filter provided at the end of the suction pipe and filled with the filler therein. Normally, since a suction filter is provided at the end of the suction pipe that is immersed in a mobile phase of the mobile phase container, by configuring the dissolved substance removal filter by filling the suction filter with a filler, increase in internal capacity of a system between the mobile phase container and the liquid delivery pump can be suppressed.

Further, there may be a case where a contaminant dissolved in the mobile phase cannot be completely removed by using only one dissolved substance removal filter. In such a case, a plurality of the dissolved substance removal filters may be provided in series along the path through which the mobile phase flows.

In the above case, the fillers of the plurality of the dissolved substance removal filters provided in series have properties of adsorbing dissolved substances different from each other. In this manner, even in a case where a plurality of types of contaminants are dissolved in the mobile phase, these contaminants can be removed from the mobile phase.

Examples of the filler with which the dissolved substance removal filter is filled include activated carbon, silica gel, a polymer, silica gel with a functional group modified on the surface, a polymer with a functional group modified on the surface, and the like.

A liquid chromatograph according to the present invention includes an analysis channel, the liquid delivery device described above that delivers a mobile phase in the analysis channel, a sample injection part configured to inject a sample into the analysis channel, an analysis column that is provided at a position downstream of the sample injection part on the analysis channel, and separates a sample injected into the analysis channel by the sample injection part into individual components, and a detector that is provided at a position downstream of the analysis column on the analysis channel, and is for detecting the components separated by the analysis column.

Effects of the Invention

The liquid delivery device of the present invention includes at least one dissolved substance removal filter filled with a filler having the property of adsorbing a dissolved substance in a mobile phase, and can remove a contaminant dissolved in a mobile phase. Then, the dissolved substance removal filter at a position upstream of a liquid delivery pump on a path through which a mobile phase flows does not increase the system volume downstream of the liquid delivery pump in an analyzer.

Since a liquid chromatograph of the present invention includes the above-described liquid delivery device, a contaminant in a mobile phase is removed, and detection of a substance other than an analyte is suppressed in high sensitivity analysis. Further, since a mobile phase from which a contaminant is removed flows through an analysis channel, contamination in the analysis system is prevented.

EMBODIMENTS OF THE INVENTION

Hereinafter, an embodiment of the present invention will be described with reference to the drawings.

Figure 1:
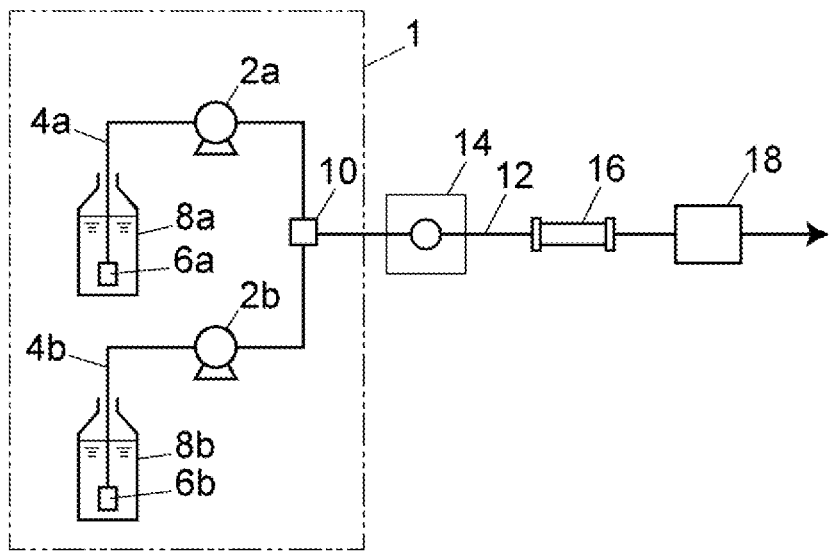
FIG. 1 is a channel configuration diagram schematically showing one embodiment of a liquid chromatograph.

First, an embodiment of a liquid chromatograph will be described with reference to FIG. 1.

The liquid chromatograph of the present embodiment includes a liquid delivery device 1 for delivering a mobile phase. The liquid delivery device 1 sucks a mobile phase solvent (hereinafter referred to as the mobile phase) that is liquid from mobile phase containers 8a and 8b by two liquid delivery pumps 2a and 2b, respectively, mixes these mobile phases in a mixer 10, and feeds the mobile phase in an analysis channel 12. On the analysis channel 12, a sample injection part 14, an analysis column 16, and a detector 18 are provided from the upstream side.

The sample injection part 14 is, for example, an autosampler that collects a sample to be analyzed from a sample container using a needle and injects the collected sample into the analysis channel 12. The analysis column 16 is for separating a sample injected into the analysis channel 12 by the sample injection part 14 into components. The sample components separated in the analysis column 16 are detected by the detector 18.

The liquid delivery pumps 2a and 2b of the liquid delivery device 1 suck a mobile phase from the sample solutions 8a and 8b through suction pipes 4a and 4b, respectively. Dissolved substance removal filters 6a and 6b for removing a contaminant dissolved in a mobile phase are provided at positions upstream of the liquid delivery pumps 2a and 2b on a path through which the mobile phase sucked by the liquid delivery pumps 2a and 2b flows. In the present embodiment, the dissolved substance removal filters 6a and 6b are provided at ends of the suction pipes 4a and 4b. However, the dissolved substance removal filters 6a and 6b may be provided at any positions as long as the positions are upstream of the liquid delivery pumps 2a and 2b.

Figure 2:
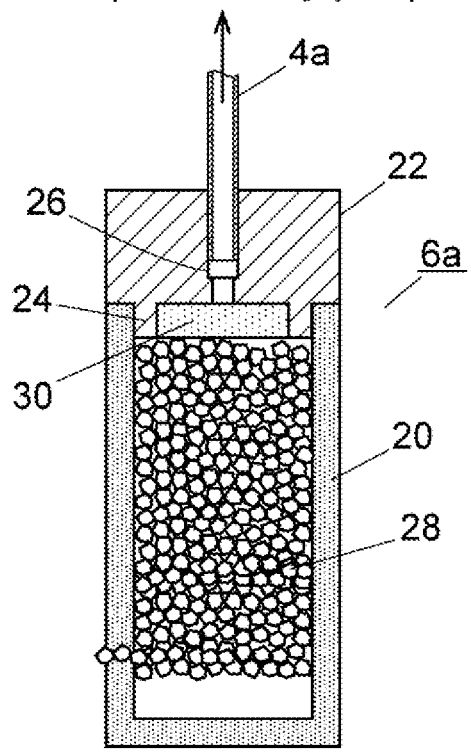
FIG. 2 is a cross-sectional view showing an example of a dissolved substance removal filter of a liquid delivery device of the embodiment.

The structure of the dissolved substance removal filters 6a and 6b will be described with reference to FIG. 2. Note that, since the dissolved substance removal filters 6a and 6b have the same structure, only the dissolved substance removal filter 6a will be described here.

The dissolved substance removal filter 6a includes a main body portion 20 that has a bottom surface and an upper opening, and has a tubular shape (for example, a cylindrical shape), and a lid portion 22 mounted on an upper portion of the main body portion 20. The main body portion 20 is made from, for example, a porous material such as ceramic, and has a function as a filter that allows liquid to pass through and does not allow a solid contaminant, such as dust and dirt in the liquid, to pass through. The lid portion 22 can be made from, for example, a resin material, such as polytetrafluoroethylene (hereinafter referred to as PTFE). However, any material may be used as long as the material is not reactive to a mobile phase.

Internal space of the main body portion 20 is filled with a filler 28. The filler 28 has the property of adsorbing a contaminant dissolved in a mobile phase. Examples of the filler 28 include, for example, activated carbon, silica gel, a polymer, silica gel with a functional group modified on the surface, a polymer with a functional group modified on the surface, and the like. In a case where a contaminant dissolved in a mobile phase is a hydrophobic compound, the contaminant can be removed by using activated carbon as the filler 28. In a case where a contaminant dissolved in a mobile phase is a surfactant in air or derived from detergent, the contaminant can be removed by using activated carbon as the filler 28. In a case where a contaminant dissolved in a mobile phase is an anionic surfactant, the contaminant can be removed by using an ion exchange base material as the filler 28.

An annular protrusion 24 is provided on a lower surface of the lid portion 22. The protrusion 24 is provided so as to be fitted to the upper surface opening of the main body portion 20, and the lid portion 22 is mounted on an upper portion of the main body portion 20 with the protrusion 24 fitted into the upper surface opening of the main body portion 20. On an inner side of the annular protrusion 24, a filter 30 made from, for example, stainless steel is provided. The filter 30 is for preventing outflow of the filler 28 with which the inside of the main body 20 is filled. A connection hole 26 for inserting and connecting the suction pipe 4a is provided on an upper surface of the lid portion 22, and the connection hole 26 communicates with internal space of the main body portion 20 through the filter 30.

The dissolved substance removal filter 6a is used by being immersed in a mobile phase in the mobile phase container 8a, and the main body 20 made from a porous material functions as a suction filter that removes a solid contaminant in the mobile phase while sucking the mobile phase. That is, when the liquid delivery pump 2a is driven in a state where the dissolved substance removal filter 6a is immersed in a mobile phase, the mobile phase is sucked while a solid contaminant is removed from the main body portion 20 functioning as a suction filter, and a contaminant dissolved in the mobile phase is also removed by the filler with which the inside of the main body 20 is filled. In this manner, a mobile phase in a state where both a solid contaminant and a soluble contaminant are removed is supplied to the analysis channel 12 of the liquid chromatograph.

Figure 3:
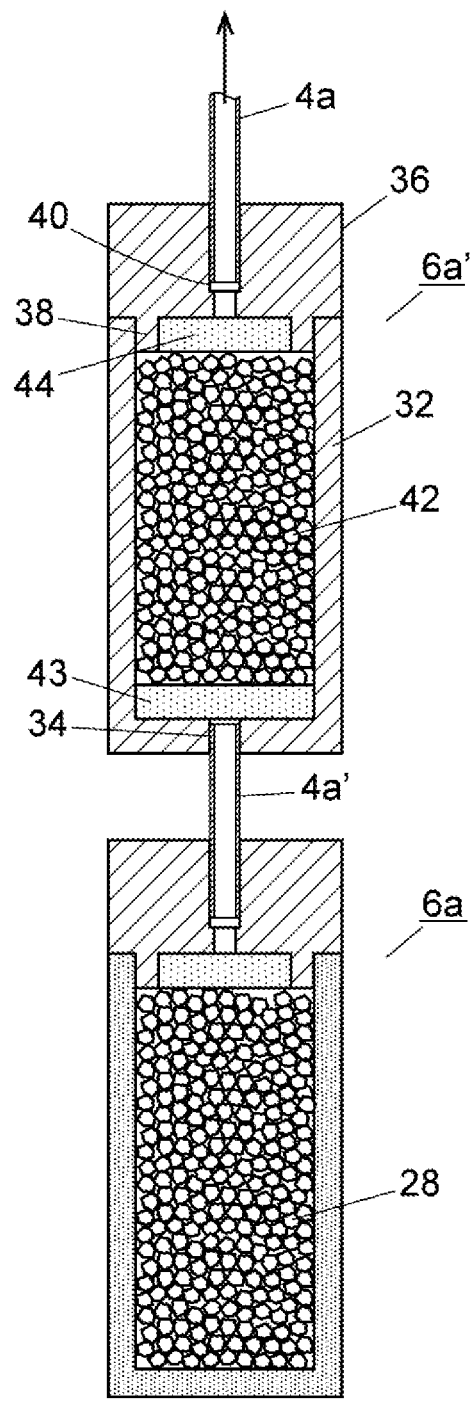
FIG. 3 is a cross-sectional view showing another example of the dissolved substance removal filter.

However, in a case where a contaminant dissolved in a mobile phase in the mobile phase container 8a cannot be removed only with one type of a filler, another dissolved substance removal filter 6a' may be provided in addition to the dissolved substance removal filter 6a as shown in FIG. 3. In this case, the dissolved substance removal filters 6a and 6a' are connected in series, so that a mobile phase sequentially passes through the dissolved substance removal filters 6a and 6a'. Also in a case where a contaminant dissolved in a mobile phase in the mobile phase container 8b cannot be completely removed by the dissolved substance removal filter 6b, a dissolved substance removal filter 6b' can be provided as in FIG. 3.

The structure of the dissolved substance removal filter 6a' shown in FIG. 3 will be described.

The dissolved substance removal filter 6a' includes a main body portion 32 that has a tubular shape (for example, a cylindrical shape) with an upper opening, and a lid portion 36 mounted on an upper portion of the main body portion 32. On a bottom surface of the main body portion 32, a connection hole 34 is provided for inserting and connecting an end of a suction pipe 4a' for connection with the dissolved substance removal filter 6a. Both the main body portion 32 and the lid portion 36 can be made from a resin material, such as PTFE. However, any material may be used as long as the material is not reactive to a mobile phase.

A filter 43 is disposed at the bottom of internal space of the main body portion 32, and an upper portion of the filter 43 is filled with a filler 42. The filter 43 is for preventing outflow of the filler 42. The filler 42 has the property of adsorbing a contaminant dissolved in a mobile phase, the contaminant different from that adsorbed by the filler 28 of the dissolved matter removal filter 6a. Examples of the filler 42 include activated carbon, silica gel, a polymer, silica gel with a functional group modified on the surface, a polymer with a functional group modified on the surface, and the like.

An annular protrusion 38 is provided on a lower surface of the lid portion 36. The protrusion 38 is provided so as to be fitted to the upper surface opening of the main body portion 32, and the lid portion 36 is mounted on an upper portion of the main body portion 32 with the protrusion 38 fitted into the upper surface opening of the main body portion 32. On an inner side of the annular protrusion 38, a filter 44 made from, for example, stainless steel is provided. The filter 44 is for preventing outflow of the filler 42. A connection hole 40 for inserting and connecting the suction pipe 4a is provided on an upper surface of the lid portion 36, and the connection hole 40 communicates with internal space of the main body portion 32 through the filter 44.

In the example of FIG. 3, two of the dissolved substance removal filters 6a and 6a' are connected in series. However, more dissolved substance removal filters may be connected in series.

Figure 4:
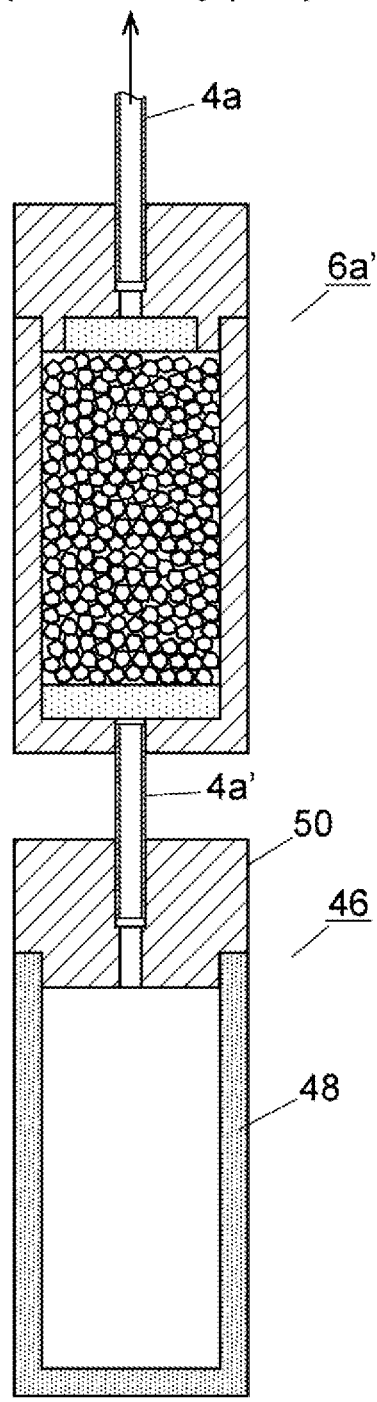
FIG. 4 is a cross-sectional view showing still another example of the dissolved substance removing filter.

In the embodiment described above, the description is made on the assumption that the dissolved substance removal filter 6a having a function as a suction filter for removing a solid contaminant in a mobile phase is used. However, the present invention is not limited to the above. As shown in FIG. 4, the configuration may be such that a conventionally used suction filter 46 is used to remove a solid contaminant in a mobile phase, and the dissolved substance removal filter 6a connected in series with the suction filter 46 removes a contaminant dissolved in the mobile phase. Note that the suction filter 46 shown in FIG. 4 includes a cylindrical main body portion 48 made from a porous material and a lid portion 50 mounted on an upper portion of the main body portion 48.

Further, in the embodiment described above, the liquid chromatograph is described as an example of an analyzer including the liquid delivery device 1. However, the liquid delivery device of the present invention including the dissolved substance removal filter is applicable to any device, as long as the device has a configuration of sucking and feeding a mobile phase in a mobile phase container. Examples of such a device include a preparative purification apparatus, a dissolution tester, and an apparatus for performing filtration and cleaning of a solvent and the like.

DESCRIPTION OF REFERENCE SIGNS

1: Liquid delivery device
2a, 2b: Liquid delivery pump
4a, 4a', 4b: Suction pipe
6a, 6a', 6b: Dissolved substance removal filter
8a, 8b: Mobile phase container
10: Mixer
12: Analysis channel
14: Sample injection part
16: Analysis column
18: Detector
20, 32: Main body portion
22, 36: Lid portion
24, 38: Protrusion
26, 34, 40: Connection hole
28, 42: Filler
30, 43, 44: Filter
46: Suction filter

The invention claimed is:

1. A liquid delivery device comprising:
a liquid delivery pump that sucks a mobile phase, which is liquid, from a mobile phase container containing the mobile phase through a suction pipe which has an end immersed in the mobile phase in the mobile phase container, and delivers the mobile phase; and
at least one dissolved substance removal filter provided at a position upstream of the liquid delivery pump on a path through which the mobile phase flows and the dissolved substance removal filter is filled with a filler having property of adsorbing a dissolved substance in the mobile phase,
wherein the dissolved substance removal filter includes a suction filter provided at the end of the suction pipe and filled with the filler therein.

2. The liquid delivery device according to claim 1, wherein a plurality of the dissolved substance removal filters are connected in series along a path through which the mobile phase flows.

3. The liquid delivery device according to claim 2, wherein the fillers of the plurality of the dissolved substance removal filters have properties of adsorbing dissolved substances different from each other.

4. The liquid delivery device according to claim 1, wherein the filler is any of activated carbon, silica gel, a polymer, silica gel with a functional group modified on a surface, or a polymer with a functional group modified on a surface.

5. A liquid chromatograph comprising:
an analysis channel;
the liquid delivery device according to claim 1 that delivers a mobile phase in the analysis channel;
a sample injection part configured to inject a sample into the analysis channel;
an analysis column that is provided at a position downstream of the sample injection part on the analysis channel, and separates a sample injected into the analysis channel by the sample injection part into individual components; and
a detector that is provided at a position downstream of the analysis column on the analysis channel, and is for detecting the components separated by the analysis column.

* * * * *